3,424,902
METHOD AND APPARATUS FOR MEASURING
Benjamin H. Colmery, Jr., Ann Arbor, Mich., and Linus K. Han, Columbus, Ohio; said Han now by change of name Linus K. Hahn, assignors to Industrial Nucleonics Corporation, a corporation of Ohio
Filed Mar. 23, 1964, Ser. No. 353,859
U.S. Cl. 250—83.3
Int. Cl. G01t 1/16; G01b 15/00
3 Claims This invention relates to non-destructive measurement of a property using the phenomena of backscatter radiation from the impingement of nuclear radiation. More particularly, the present invention is concerned with method and apparatus for improving the sensitivity of the property measurement using nuclear radiation, such as gamma rays, alpha, and beta particles.

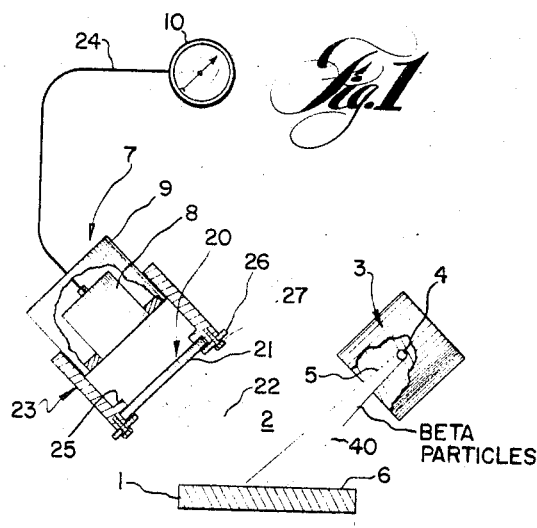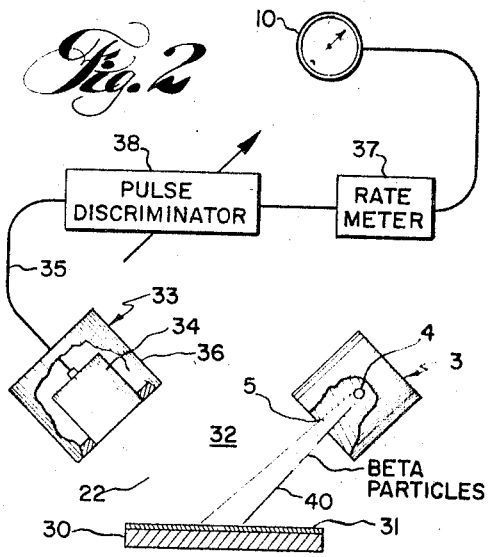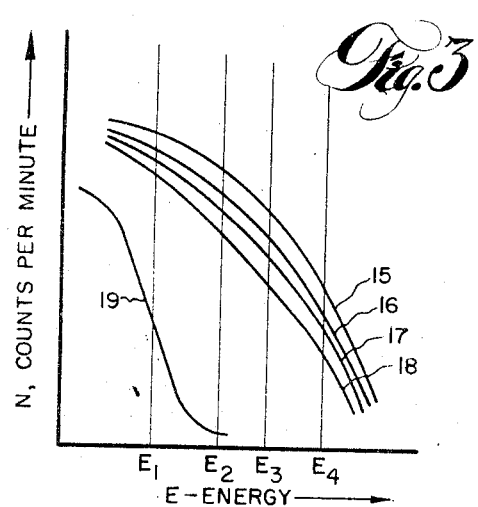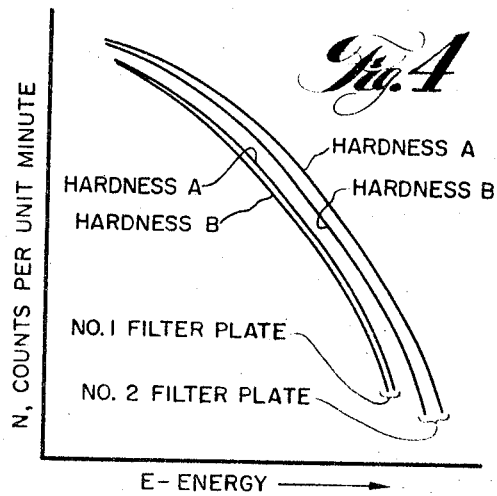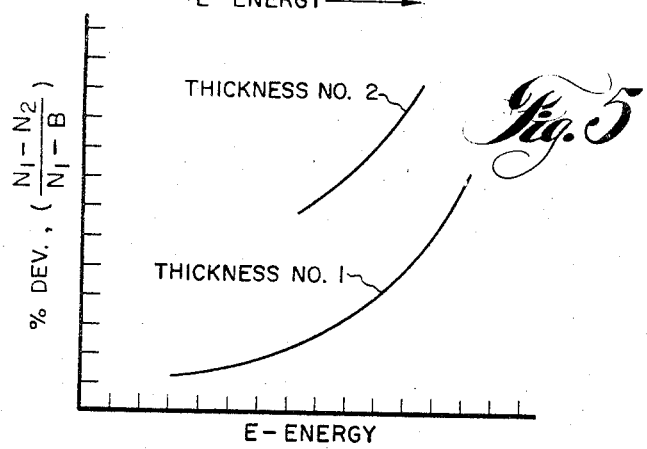
INVENTORS
BENJAMIN H. COLMERY, JR.
LINUS K. HAN
BY William T. Fryer III
ATTORNEY

United States Patent Office 3,424,902
Patented Jan. 28, 1969

It is well known that the measurement of a property, such as material hardness or weight per unit area (or thickness when density is constant) can be accomplished by the measurement of the backscatter radiation intensity produced by the impingement of nuclear radiation, such as beta particles on a material (see United States Re. 22,531 to D. G. C. Hare, issued Aug. 22, 1944, and United States patent application Ser. No. 790,726, filed Feb. 2, 1959 to Donald E. Varner, now U.S. Patent 3,160,753, for example). It also has been disclosed that, by selecting particular energies of the backscatter radiation, a property at a particular depth in a material can be measured (see United States Patents 2,939,012, issued May 31, 1960, and 2,997,586, both issued to S. A. Scherbatskoy, for example). It is not known, heretofore, how to increase the sensitivity of the property measurement, such that smaller changes in weight per unit area or hardness, for example, can be distinguished and radiation sources can be reduced in size and still obtain distinct indications of property changes. These are the objects of the present invention.

It has been discovered that certain energies of the backscatter radiation appear to have a more predominant change in intensity for changes in a property than other energies. By adjusting the detector response to emphasize the energies having substantially the most predominant change, the property measurement sensitivity is increased.

Several types of apparatus can be arranged to practice this method, there being illustrated two examples hereinafter of, first, an energy filter through which the backscatter radiation passes before reaching the detector means, or, second, a detector producing an electrical pulse with an amplitude substantially proportional to the radiation energy coupled to a pulse discriminator adjusted to discriminate against pulses from energies that contain less information.

The description of a detailed embodiment of the present invention refers to the attached figures, wherein, FIG. 1 is a schematic of an apparatus for measuring hardness arranged in accordance with the present invention.

FIG. 2 is a schematic of an apparatus for measuring coating thickness arranged in accordance with the present invention.

FIGS. 3, 4, and 5 are graphs used to illustrate the method of the present invention.

The measurement of a property, such as hardness, of material 1 by a backscatter gauge 2 is illustrated in FIG. 1. In this example the penetrative radiation is predominantly beta particles 40 from a source chamber 3. The beta emitter is a capsule 4 of radioactive material, such as Kr–85, or Sr–90, that emit negative beta particles, the choice of an appropriate source depending on the property and material to be measured. For example, an electron gun may be used under suitable circumstances. Source 3 has a slot 5 through which the beta particles are collimated to impinge on the surface 6 of material 1 over a predefined area. The interaction of the beta particles with material 1 produces a backscatter radiation of predominantly beta particles, and the intensity of a portion thereof is measured by a detector 7 disposed at any desired angle with respect to the surface of material 1 and the position of source 3. Detector 7 is primarily responsive to negative beta particles including a radiation transducer 8 in housing 9 and indicator 10.

The measurement of hardness using backscatter gauge 2 follows the method taught in the above-mentioned Varner application. This method measures the hardness of a metallic workpiece having substantially constant, homogeneous composition, and comprises the steps of directing into a surface of the workpiece a beam of beta radiation having an energy characteristic such that the workpiece presents an infinite thickness to said beam, detecting the reflected radiation returned backwardly from the surface to provide an electrical signal proportional to the intensity of the reflected radiation, and indicating the hardness of the workpiece as a function of the signal. The radiation intensity varies with hardness when material 1 is of an infinite thickness for the energy of the beta particles and indicator 10 can be calibrated in units of hardness.

The present invention provides method and apparatus for increasing the indication of hardness for a given backscatter gauge. The gauge sensitivity is increased or, said another way, the signal-to-noise ratio is improved. The improvement is the result of adjusting the response of detector 7 to emphasize particular backscatter radiation energies incident on the detector 7 in order to convey greater information on material hardness than would be given by other backscatter radiation energies incident on the detector 7. The reason for this unusual result is not precisely known, but it appears that certain backscatter radiation energies change intensity to a greater extent than other backscatter radiation energies when hardness changes. This means that some of the backscatter radiation energies can be substantially eliminated before the radiation intensity is indicated without removing substantially any information. In fact, by eliminating these energies a hardness change produces a greater change in the indicated radiation intensity than before, when the intensity of substantially all energies were indicated.

The improved sensitivity is illustrated by reference to graphs of FIGS. 3, 4, and 5. These graphs are not drawn to follow religiously a set of test data, but are exaggerated in parts to emphasize the relationships for explanation purposes. These general relationships were established by tests with a negative beta particle source and a detector primarily responsive to negative beta particles.

The graph of FIG. 3 shows the energy spectra 15, 16, 17, and 18 (intensity or counts per minute at each energy of the backscatter radiation) for materials of progressively greater hardness, respectively, Spectrum 19 is the background radiation (intensity or counts per minute of the radiation scattered from air with no material present). It can be seen that there is less change in intensity at the low energies, below $E_1$, for a change in hardness than between energies $E_2$ and $E_3$, and an even greater change occurs between energies $E_2$ and $E_3$. The change drops off gradually between energies $E_3$ and $E_4$, and above the energy $E_4$ the change becomes even smaller.

Since the intensity change is greater in the mid-range, $E_2$ to $E_3$, than at the lower energies, it is desirable and feasible to eliminate the lower energies from the backscatter radiation measurement. There is another very good reason to make this energy selection. The background radiation (noise) is quite high at the low energies and, by eliminating these energies from the measurement, the signal-to-noise ratio is reduced simplifying the source design and improving the sensitivity of the measurement.

In addition to the elimination of the energies at the low end adjacent the energies of more predominant change, a further refinement is to select only the energy range where the more predominant occurs. A range, such as $E_2$ to $E_3$, can be selected and the backscatter radiation of other energies can be substantially eliminated. This selection provides an even greater sensitivity to changes in hardness and improves the signal-to-noise ratio.

The method of the present invention can be practiced by several apparatuses. Two embodiments are described, for illustration only and not to limit the invention thereto. The first embodiment employs a filter in the form of an absorbing material in the path of the backscattered radiation and of a selected thickness in accordance with the present invention to eliminate particles that have energies containing little information. The other embodiment utilizes the adjustment of a pulse discriminator, where the backscatter radiation is converted to electrical pulses of amplitudes substantially proportional to the energy, and the pulses coupled to a count-rate meter are selected, by adjusting the pulse height discriminator, in accordance with the present invention, to obtain the pulses with the most information on the property change.

The backscatter gauge 2 (FIG. 1) can be provided with an energy filter 20 that effectively becomes part of detector 7 to change the energy response and improve the sensitivity of gauge 2. Filter 20 comprises a plate 21 positioned in front of transducer 8 in the path of the backscatter radiation 22 by a cylindrical bracket assembly 23 attached to housing 9. Plate 21 is held against a circular foot 25 by a flat ring-shaped plate 26 secured by fasteners 27. Bracket assembly 23 is designed to accommodate plates of differential thickness (thickness herein referring to the plate dimension in the direction of the backscatter radiation 22). Transducer 8 can be any one of a number of types, such as an ionization chamber, GM counter, scintillation crystal with photomultiplier, for example, coupled to electronic circuitry (not shown) of conventional design to provide an output signal over line 24 that is proportional to the backscatter radiation intensity reaching transducer 20 after passing through plate 21. The output signal can be suitably processed to serve a control function in an industrial process, if desired, and is suitably indicated on a meter 10 that can be calibrated in units of hardness.

Filter 20 can be arranged in a number of other ways, the important criteria being that the backscatter radiation that passes through to transducer 8 passes through plate 21. For example, no bracket assembly need be used and plate 21 can be fastened directly to the face of transducer 8. In any case, the heart of filter 20 is the plate 21 that acts as energy filter, substantially preventing energies below a certain energy, determined by the plate thickness, from reaching transducer 8. The thickness of plate 21 is generally uniform in the area through which the backscatter radiation passes so that all the backscatter radiation is uniformly filtered. A wide range of materials can be used for plate 21, such as stainless steel, for example only.

The operation of gauge 2 with filter 20 is illustrated by reference to the graphs of FIGS. 3, 4, and 5. The adjustment of filter 20 follows the step of selecting a thickness of plate 21 that removes the scattered particles having energies below a certain limit that have less information on a hardness change. Different thicknesses of plates 21 can be inserted in bracket assembly 23 and the indication change for two materials of different hardness can be observed until the change is close to maximum. The results of this adjustment are shown in FIG. 4. The energy spectra for a filter plate 21 of thickness #1 for materials of hardness A and B (A being greater than B) shows a distinguishable intensity indication change. When filter plate 21 of thickness #2, smaller than thickness #1, is inserted the intensity indication change is much greater.

Filter plate 21 of thickness #2 improves the sensitivity of gauge 2, emphasizing the information energies of the backscatter radiation. The emphasis is more clearly shown by the graph of FIG. 5. The ordinate is percent deviation or change of indication with the filter plates of thicknesses #1 and 2 from the curves of FIG. 4. The computation includes $N_1$, the radiation intensity at hardness A, $N_2$, the radiation intensity at hardness B, and B, the background radiation, in the formula $$\frac{N_1-N_2}{N_1-B} \qquad (1)$$

The abscissa is energy of the scattered radiation particles. The result of the calculation and plot shows that the percent deviation is much higher when gauge 2 uses filter plate 21 of thickness #2 and the slope of the thickness #2 curve is generally greater, so that the indication for a small change in hardness will be higher than when filter plate of thickness #1 is used.

The emphasis of energies carrying more information with the method just described can be applied to other property measurements, such as the measurement of material or coating thickness. A source of predominantly negative beta particles can be used for these measurements. In FIG. 2, for example, the thickness of coating 31 on material 30 can be measured with gauge 32 having a beta particle source 3. Corresponding parts in FIGS. 2 and 1 are given the same reference number. Gauge 32 is another embodiment of apparatus that can practice the method of the present invention.

Other types of energy filters can be used, such as a magnetic or electric field to substantially divert or eliminate beta particles of undesired energies, for example.

As in the practice in the art, to measure thickness of coating 31 the material 30 must be an infinite thickness. A detector 33 is disposed to receive the backscatter radiation 22 that strikes a radiation transducer 34 within housing 36 to provide electrical pulses of amplitude proportional to the energy of the backscatter radiation over line 35. Radiation transducer can be of any type that performs the energy-to-pulse amplitude conversion. For example, a proportional counter or a scintillation crystal, such as anthracene or stillbene, or plastic phosphor which are primarily responsive to beta particles, with a photomultiplier tube can be utilized. The associate electronic circuitry is also provided (not shown) to produce the pulses over line 35. At least some of these pulses are ultimately counted by any conventional means, such as by rate meter 37, the total count per unit time, which can be a continuous readout, being indicated by a device such as meter 10 and used to control an industrial process, if desired.

To select the backscatter energies with the more predominant indication change for a change in hardness, gauge 32 includes means to electronically discriminate against pulses from detector 33 for energies that have a less predominant indication deviation. The pulses from detector 33 are passed through a pulse discriminator 38 before reaching count-rate meter 37. Pulse discriminator 37 can be of several conventional types. For example, pulses below a certain amplitude edge (amplitude corresponding to the energy) can be eliminated from the discriminator output to rate meter 37. Alternatively, the pulses in an amplitude range of adjustable width about a given adjustable amplitude, can selectively pass pulses to count-rate meter 37.

In setting up gauge 32, discriminator 38 is adjusted using test samples of different coating thickness. With edge discrimination, the amplitude below which the pulses are eliminated is varied, say upward, until the indication change in meter 10 for two samples drops off. The pulse discriminator is left near the point of maximum deviation. For range discrimination, the center amplitude with a moderate width range of the pulse discriminator is adjusted, say upward, until the maximum indication deviation is noted for the two samples. Then the range width is varied, again for maximum indication deviation. Further adjustments of the center amplitude and range width can follow to peak up the indication deviation.

While the method of the present invention has been described as practiced by two apparatus embodiments, the method can be applied to other forms of apparatus without departing from the present invention as defined in the appended claims. The disclosed apparatuses also embody unique features that can be changed or modified to several other forms without departing from the present invention as defined in the appended claims.

What is claimed is:

1. An improved method of increasing the sensitivity of a hardness gauge using a radioactive source of predominantly beta particles that impinge on the surface of a material having an infinite thickness and a detector means responsive primarily to beta particles disposed to measure the backscattered radiation intensity from the material, comprising the steps of first measuring the backscatter radiation intensity from one hardness sample of constant, homogeneous composition; second, measuring the backscatter radiation intensity from another sample of a different value of said hardness and of the same constant, homogeneous composition as said one sample; then comparing said hardness measurements to identify the difference in intensity indication, and repeating said aforementioned steps as the energy response of said detector is adjusted to obtain said difference indication substantially maximum.

2. The method, as described in claim 1, wherein, the response of said detector means is adjusted by having the backscatter radiation produce electrical pulses of amplitudes proportional to the radiation energy that are counted to measure radiation intensity and discriminating against selected pulse amplitudes that have a smaller difference in pulse count than other energies for a change in hardness.

3. The method, as described in claim 1, wherein, said detector means is adjusted by varying the thickness of a filter material in the path of the backscattered radiation to select the desired energies.

References Cited

UNITED STATES PATENTS

| | | |
|---|---|---|
| 2,901,629 | 8/1959 | Friedman. |
| 2,951,161 | 8/1960 | Foster et al. 250—83.3 X |
| 2,967,934 | 1/1961 | Martinelli 250—83.3 X |
| 3,156,824 | 11/1964 | Peyser 250—105 |
| 3,176,130 | 3/1965 | Brinkerhoff 250—86 X |

FOREIGN PATENTS 846,416  1/1959  Great Britain.

OTHER REFERENCES

Bogdanov et al.: Uses of Radioactive Isotopes in Metallurgy Symposium XXXIV, Part 1; 1955; 193–218.

RALPH G. NILSON, *Primary Examiner.*

A. B. CROFT, *Assistant Examiner.*

U.S. Cl. X.R.

250—83.3